(12) United States Patent
Van Baren

(10) Patent No.: US 7,426,426 B2
(45) Date of Patent: Sep. 16, 2008

(54) SYSTEM AND METHOD FOR SIMULTANEOUSLY CONTROLLING SPECTRUM AND KURTOSIS OF A RANDOM VIBRATION

(75) Inventor: Philip D. Van Baren, Wyoming, MI (US)

(73) Assignee: Vibration Research Corporation, Jenison, MI (US)

( * ) Notice: Subject to any disclaimer, the term of this patent is extended or adjusted under 35 U.S.C. 154(b) by 0 days.

(21) Appl. No.: 11/570,176

(22) PCT Filed: Jul. 5, 2005

(86) PCT No.: PCT/US2005/023880

§ 371 (c)(1),
(2), (4) Date: Dec. 7, 2006

(87) PCT Pub. No.: WO2006/017086

PCT Pub. Date: Feb. 16, 2006

(65) Prior Publication Data

US 2007/0185620 A1    Aug. 9, 2007

(51) Int. Cl.
*G01M 7/02* (2006.01)
*G01M 1/38* (2006.01)
(52) U.S. Cl. ........................ 700/280; 702/191
(58) Field of Classification Search ............. 700/280; 702/191
See application file for complete search history.

(56) References Cited

U.S. PATENT DOCUMENTS 3,710,082 A * 1/1973 Sloane et al. ............... 700/280
3,848,115 A * 11/1974 Sloane et al. ............... 700/280
5,012,428 A * 4/1991 Ueno et al. ................. 700/280
2003/0125910 A1* 7/2003 Randmaa et al. ........... 702/191

OTHER PUBLICATIONS

Wood "Detection and Capaacity Limits in Magnetic Media Noise" IEEE Transactions on Magnetics vol. 34, No. 4, Jul. 1998 pp. 1848-1850.*
Steinwolf "Shaker Simulation of Random Vibration with a High Kurtosis Value" Journal of the Institute of Environmental Sciences May/Jun. 1997 pp. 33-43.*
Steinwolf et al. "Numerical and experimental studies of linear systems subjected to non-Gaussian random excitations" Probablistic Engineering Mechanics 14 ,1999, pp. 289-299.*

* cited by examiner

*Primary Examiner*—Albert DeCady
*Assistant Examiner*—Steven R Garland
(74) *Attorney, Agent, or Firm*—Barnes & Thornburg LLP

(57) ABSTRACT

A system and method for producing and controlling a random signal with simultaneous control of both the power spectral density (PSD) and kurtosis (100) where a controlled signal is measured from a transducer, and converted to a PSD (111) using a Fast Fourier Transform (FFT). The measured PSD is compared (117) with a reference PSD (121) where an adaptive filter (119) is updated to compensate for the error. Simultaneously the kurtosis of the measured data is computed (125) and compared to a reference kurtosis (123). A feedback control loop (127) is employed to adjust the kurtosis of a white noise random generator with variable kurtosis (101). This white noise is then filtered by the adaptive filter (119) to provide the output signal used to drive the control process.

12 Claims, 6 Drawing Sheets

SYSTEM AND METHOD FOR SIMULTANEOUSLY CONTROLLING SPECTRUM AND KURTOSIS OF A RANDOM VIBRATION

TECHNICAL FIELD

This invention relates in general to mechanical vibration systems and more particularly a method for simultaneously controlling spectrum and kurtosis of random vibration.

BACKGROUND OF THE INVENTION

Mechanical vibration is a normal part of the environment for most products. Vibration can be a result of the location of a product installation or can occur when a product is being transported. An example of the former is a radio installed in a vehicle. During normal operation of the vehicle the radio will experience vibration due to the motion of the vehicle across uneven roads. An example of the latter is a television. While in normal operation the television may be stationary, it must be transported from the factory to the warehouse, to the store, and finally to the home. During this transportation it will experience vibration due to the motion of the transport vehicle and due to moving the product on an off of the transport vehicle.

Since products will normally encounter vibration, it is necessary to design products such that they will survive any vibration experiences when not operating, and continue operating properly even when experiencing vibration during operation. A standard part of the design process is testing the product under vibration to verify proper operation. While it is possible to test some products directly in their natural environment, in many cases it is preferable to reproduce the vibration environment under controlled circumstances in a test lab.

The type of vibration encountered by a product during its lifetime can vary from a continuous repetitive motion to isolated transients to continuous random motion. An example of repetitive motion is the rotation of a drive shaft in a vehicle. This type of vibration is simulated in the lab using a single frequency sine wave. An example of an isolated transient is a package dropping to the floor after being removed from the transport vehicle. This type of vibration is simulated in the lab using a shock transient waveform reproduction. An example of continuous random motion is the vibration of a vehicle as it is travels down the road. This type of vibration can be simulated in the lab by recording a typical vibration, and then reproducing this waveform in the lab.

However, due to expediency and to legacy, the measured real-world vibration waveform is typically reduced by dividing the waveform into time segments, computing the Power Spectral Density (PSD), also called the frequency spectrum, of each time segment, and combining these spectra to create an overall reference PSD which is representative of the entire data set. This PSD is then traditionally reproduced in the lab using a Gaussian random noise signal with the frequency spectrum of the random noise shaped to match the reference PSD of the measured data. This is done out of expediency because a large data set can be reduced down from a long waveform to a single PSD, typically defined by only 4 to 10 values. This is done due to legacy because, until recently, the vibration controllers available were not capable of reproducing a recorded waveform, but they were capable of producing a random noise with a specific frequency spectrum, so many test specifications were written specifically for the Gaussian random noise with a shaped PSD.

One characteristic of the traditional random vibration control systems, and therefore also of nearly all test specifications for random vibration currently in use, is they assume that the probability distribution of real-world vibration is Gaussian, and therefore attempt to duplicate a Gaussian probability distribution in the lab. While many natural phenomena exhibit random behavior with a Gaussian probability distribution, it is becoming recognized that this is not always a good assumption for vibration. Specifically, the Gaussian probability distribution has a very low probability of 'outlier' data, with peak values typically no more than 4 times the RMS level. On the other hand, real-world vibration measurements exhibit considerable 'outlier' data with peak values of 8 to 10 times the RMS level being common.

It has been suggested by the prior art that it is important to also consider the kurtosis of the data, and not just the PSD, when analyzing the data. The kurtosis is a statistical measure defined as the ratio of the fourth statistical moment divided by the square of the second statistical moment. Since the fourth statistical moment will weight the outliers heavily, the presence of outliers in the vibration waveform will result in an increased kurtosis value. While data with a Gaussian distribution will by definition always have a kurtosis level equal to 3, real-world data typical exhibits kurtosis values of 5 to 8.

While methods of producing random vibrations with higher kurtosis levels have been proposed in the prior art, those previously proposed methods are not technically feasible for closed loop control. Some of the prior art describes systems based on the systems described in U.S. Pat. No. 3,710,082 which is herein incorporated by reference. This patent describes a control technique which has been superseded by more advanced methods. In addition, the prior art based on U.S. Pat. No. 3,710,082 increases the kurtosis of the signal by introducing non-random phase relationships between frequencies, thereby also reducing the randomness of the signal. A second method proposed in the prior art is more aligned with current random vibration control techniques, but uses a non-linear waveform distortion method to adjust the kurtosis, which will distort the frequency spectrum, making it difficult to control both the kurtosis and the frequency spectrum simultaneously. Introducing a non-linearity results in production of harmonics, which makes non-random amplitude and phase relationships between frequencies, and therefore this method also reduces the randomness of the signal.

Thus, there is a need for a system and method for simultaneously controlling both the frequency spectrum and the kurtosis of a random vibration such that each can be controlled independently of the other, and where the amplitude and phase of the PSD retains the full randomness typical of current Gaussian random vibration control methods.

SUMMARY OF THE INVENTION

A system of controlling a random vibration with both a prescribed frequency spectrum and a prescribed kurtosis level is described. This system has the unique characteristic that the parameters which define the kurtosis do not affect the frequency spectrum, so the kurtosis can be manipulated without disturbing the frequency spectrum, and without introducing non-random relationships between frequencies. In what follows, the testing apparatus will be referred to generically as a "shaker system." The term "shaker system" is intended to include any of a large number of methods for producing motion and vibration, and any of a large number of methods for measuring the motion. As the focus of this invention is the control of these systems, and as this control is applicable to any of these means of generating and measuring motion, these will be grouped all under the generic term "shaker system" which implies a system which takes an input signal, produces a vibration, measures the vibration, and outputs a signal related to the measured vibration. Those skilled in the art will recognize that this term is not intended to restrict the type of apparatus that may be controlled in this manner.

The system begins with a zero-mean, unit-variance, white noise source. The probability distribution of this source is varied to increase or decrease the kurtosis level of the source while retaining the zero-mean, unit-variance, and whiteness properties of the source. This white noise source is then filtered using an adaptive filter to shape the spectrum of the signal as desired, and this filtered signal is output to a shaker system. The motion measured by the shaker system is analyzed to determine its PSD, and the adaptive filter is continuously updated to shape the frequency spectrum of the white noise source such that the measured PSD approaches the prescribed reference PSD.

Simultaneously the kurtosis of the measured vibration is computed, and a feedback control loop employed to manipulate the probability distribution of the white noise source such that the difference between the measured kurtosis and the reference kurtosis is reduced. Since the kurtosis manipulation is done in such a way as to retain the unit-variance property of the noise source, this modification will not affect the RMS amplitude of the filtered noise signal. Since the modification is also done in such a way to maintain the whiteness property of the noise source, this modification will not affect the frequency spectrum of the filtered noise. As a result, the kurtosis of the vibration can be controlled independently and without affecting the frequency spectrum.

DETAILED DESCRIPTION OF THE INVENTION

Figure 1:
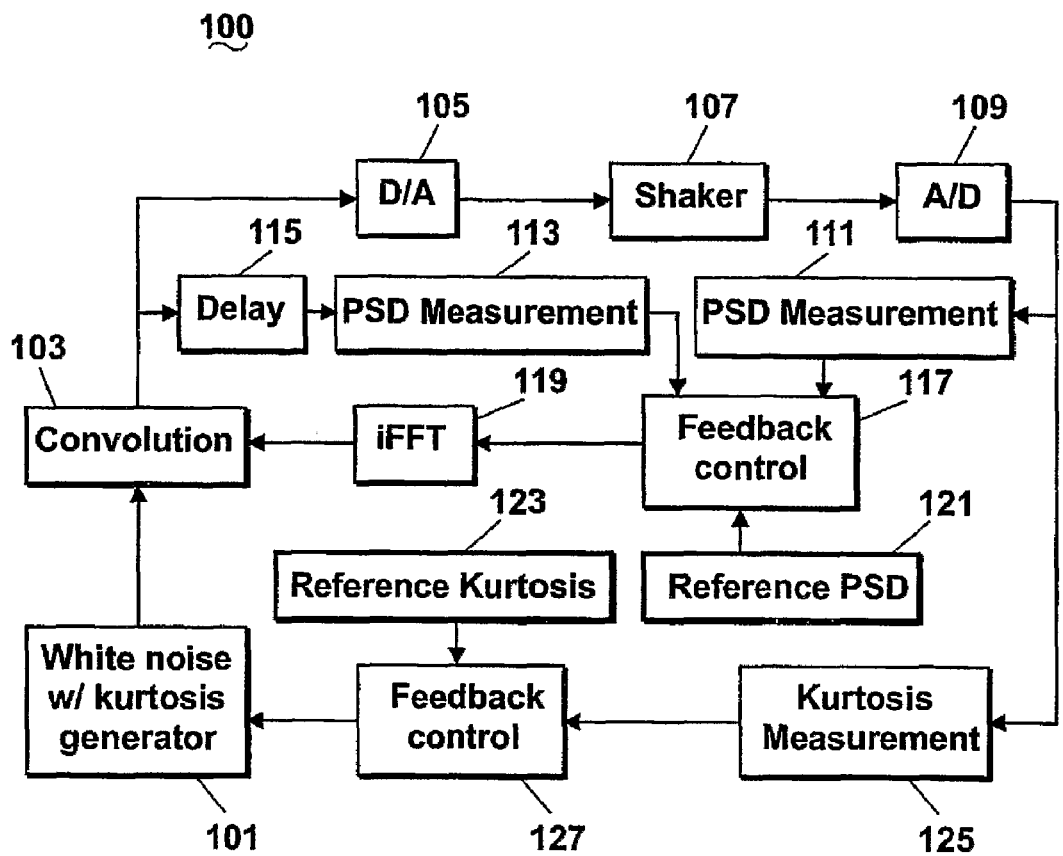
FIG. 1 is a block diagram of the system for simultaneously controlling both the spectrum and the kurtosis of a random vibration.

FIG. 1 details a block diagram of the system for simultaneously controlling spectrum and kurtosis of a random vibration 100. The noise source 101 produces a white noise random sequence with probability distribution controlled by an input variable. The term "white noise" as used herein is defined as a random sequence, the individual values of which are Independent, Identically Distributed (IID) random variables. Mathematically the statistical independence of two random variables, $w_i$ and $w_j$, implies that $E[w_i w_j]=E[w_i]E[w_j]$. The adjustable probability distribution is chosen such that the kurtosis of the random sequence output from this block is adjustable, while the variance of the random sequence is constant, independent of the input variable. One example of such a noise source is modulating a Gaussian random variable by an independent variable. Since the independence of x and y implies $E[xy]=E[x]E[y]$ and $E[(xy)^2]=E[x^2]E[y^2]$ and $E[(xy)^4]=E[x^4]E[y^4]$, then any modulation variable, y, with $E[y^2]=1$ will retain the zero-mean, unit-variance, and whiteness properties of the original Gaussian random variable. Furthermore, if $E[y^4]>1$, then the result of the modulation will have a kurtosis higher than the kurtosis of the original Gaussian random variable. The modulation variable, y, may be either deterministic or random in nature. A further example of a suitable noise source will be demonstrated with FIG. 3.

This noise source, which by definition has a flat frequency spectrum, then is passed through a convolutional filter 103 to impose a shaped frequency spectrum on the signal. In order to provide calculation efficiency, this convolution is typically performed using standard FFT-based convolution methods, although any convolution method may be used. The signal is then converted from a digital sequence to an analog waveform via a Digital-to-Analog (D/A) converter 105 and output to a shaker system 107. The shaker system incorporates some means to generate vibration motion, and some means for measuring the motion. The measurement of the motion is then converted from an analog waveform to a digital sequence via an Analog-to-Digital (A/D) converter 109 where the time-domain sequence is then transformed to a frequency domain signal by means of Power Spectral Density (PSD) measurement 111.

Simultaneously, the output of the convolution filter 103 is delayed by means of a digital time delay 115 by a time approximately equal to the total time delay of the D/A 105, shaker 107 and A/D 109 to better temporally align the output of the delay 115 with the output of the A/D 109. This delayed sequence is then transformed from a time-domain to a frequency domain signal by means of PSD measurement.

The reference PSD 121 provides the desired shape of the PSD of the vibration motion. This shape is compared with the measured PSD 111 and the drive output PSD 113 using a feedback control means 117 to produce a compensating PSD for shaping the white noise source 101. This feedback control means 117 employs some feedback control method to adjust the noise shaping PSD such that the error between the reference PSD 117 and the measured vibration PSD 111 is minimized. One such feedback control method is illustrated in FIG. 2 while yet another suitable feedback method is to update the compensating PSD by a term proportional to the error between the measured PSD and the reference PSD.

This compensating PSD is then converted from the frequency domain to the time domain by means of an inverse Fast-Fourier-Transform (iFFT) 119 to provide an Finite Impulse Response (FIR) filter. The iFFT 119 may incorporate any of the standard windowing techniques as are commonly used in practice. The FIR filter is then convolved 103 with the white noise source 101 to shape the frequency spectrum of the noise, which completes the feedback control path for achieving the reference PSD 121.

Simultaneously and independently of the PSD control loop, a kurtosis measurement 125 is computed from the digital sequence representation of the vibration from the A/D 109. This measurement is compared with the reference kurtosis 121 by a standard feedback control method 127 such that the error signal between the measured kurtosis and the reference kurtosis is minimized. The feedback control 127 produces a signal which is applied to the white noise with kurtosis generator 101 to vary the probability distribution of the white noise source, so as to reduce the difference between the reference and measured kurtosis, which completes the feedback control path for achieving the reference kurtosis 123.

Figure 2:
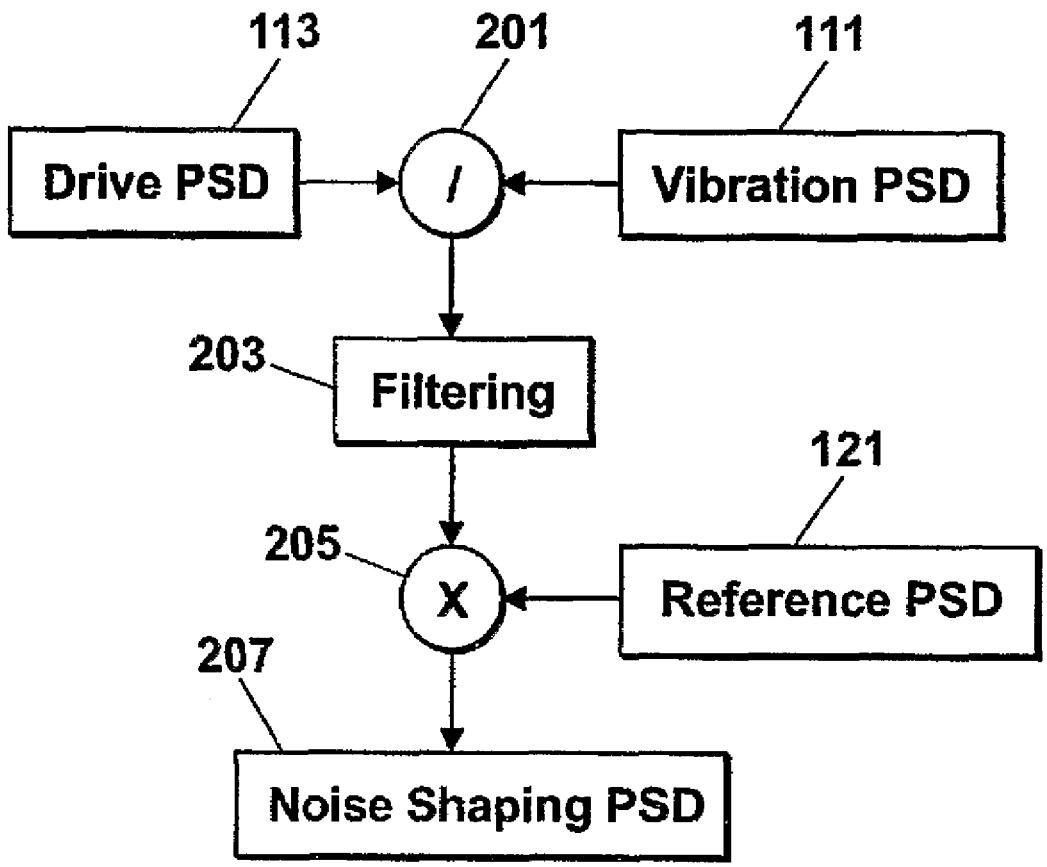
FIG. 2 is a block diagram showing an exemplary embodiment of a control method for generating the noise shaping spectrum.

FIG. 2 details a suitable feedback control method as shown by the feedback control 117 illustrated in FIG. 1. The measured Drive PSD 113 is divided by the measured Vibration PSD 111 with a frequency-by-frequency division operator 201. The result of this operation is an estimate of the Frequency Response Function (FRF) of the shaker system 107 as illustrated in FIG. 1. This estimate is then filtered 203 to smooth out the estimates which will typically be partially corrupted by measurement noise. After filtering, the FRF is multiplied by the reference PSD 121 with a frequency-by-frequency multiplication operator 205 to get the desired noise shaping PSD 207. This noise shaping PSD is then used to create the FIR noise shaping filter 119 used in the convolution 103.

Figure 3:
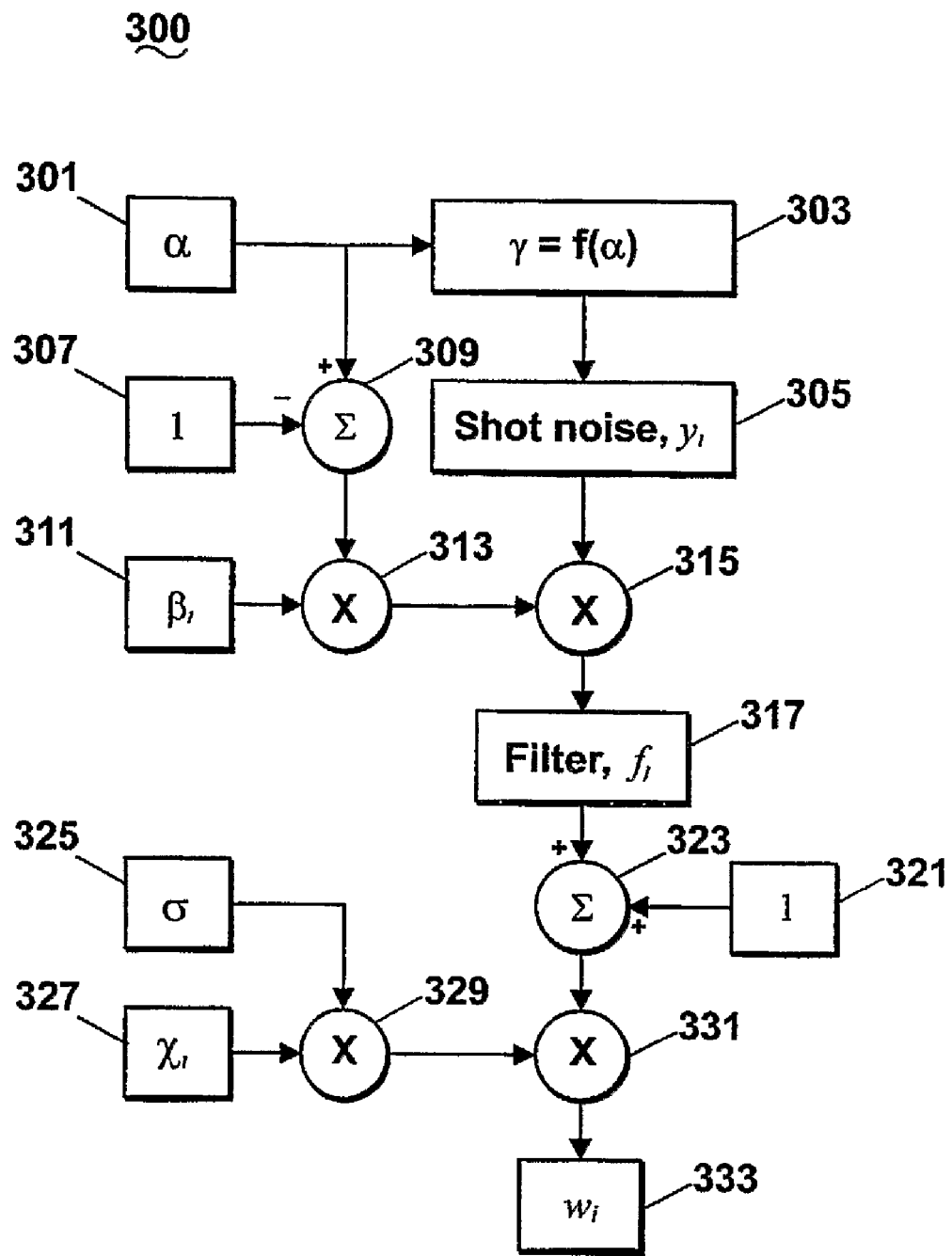
FIG. 3 is a block diagram showing an exemplary embodiment of a method for generating a unit-variance white noise random sequence with kurtosis adjusted by means of an input variable.

FIG. 3 details a suitable method for generating white noise with variable kurtosis as illustrated by the white noise with kurtosis generator 101 as shown in FIG. 1. This method modulates the amplitude of a Gaussian random variable using a baseline amplitude with additive filtered shot noise. The input variable α 301, determines the amplitude of the shot noise relative to the baseline amplitude. It should be evident to those skilled in the art that the shot noise frequency, γ, is computed as a function 303 of the input variable α 301 using an appropriate relationship. A useful relationship is to chose the value γ which maximizes the kurtosis of the generated white noise for the given value α. This shot noise is then multiplied 313, 315 by the input parameter (α−1) 307,309 and by a random amplitude factor, $\beta_i$, 311.

The scaled shot noise is then filtered 317 using a filter function which may be as simple as a multiplicative constant, or may be an FIR or IIR filter. In practice the filter impulse response should be chosen such that it is non-negative, so the shot noise only increases the noise level over the baseline level. The baseline amplitude value 321 is added 323 to the filtered shot noise 317. A zero-mean, unit-variance, white noise Gaussian random sequence, $x_i$, 327 is scaled by a normalization constant, σ, 325. This scaled Gaussian random sequence is then amplitude modulated 331 by the result of the baseline plus filtered shot noise sequence 323, resulting in a white noise random sequence, $w_i$, the kurtosis of which can be manipulated by changing the input variable, α.

It will be evident to those skilled in the art that the generated random sequence, $w_i$, remains a zero-mean, unit-variance, white-noise random sequence. This can be demonstrated by functionally defining this process as follows:

$x_i$=unit-variance, zero-mean, Gaussian IID random sequence, 327 $u_i$=uniform distribution, [0,1) IID random sequence $y_i$=0 for $u_i \geq \gamma$=1 for $u_i < \gamma$, 305 $\beta_i$=arbitrary IID random sequence with $E[\beta]=(\alpha-1)$, 311 $f_i$=filter impulse response function, defined for $i \geq 0$, 317 (1)

$w_i = \sigma(1+\Sigma_j(f_j)(\beta_{i-j})(y_{i-j}))\cdot(x_i)$, 333 (2)

Note here that the sum $\Sigma_j$ is performed over the length of the filter impulse response function. In the case of Infinite Impulse Response filters, the sum is taken to be the limit as N→∞ of the sum over j=0 to N, assuming the limit exists. For sake of conciseness, define the following-values, where E[ ] is the statistical expectation operator.

$B_1 = E[\beta] B_2 = E[\beta^2] B_3 = E[\beta^3] B_4 = E[\beta^4]$ (3)

$F_1 = \Sigma_j(f_j) \; F_2 = \Sigma_j(f_j^2) \; F_3 = \Sigma_j(f_j^3) \; F_4 = \Sigma_j(f_j^4)$ (4)

The normalization factor, σ will be defined such that the generated white noise process remains unit-variance:

$$\sigma^2 = 1/(1+\gamma(2F_1 B_1 + F_2 B_2) + \gamma^2(F_1^2 - F_2)B_1^2)$$ (5)

Assumptions:

$0 < \gamma < 1 (1 + \gamma(2F_1 B_1 + F_2 B_2) + \gamma^2(F_1^2 - F_2)B_1^2) > 0$ for $0 < \gamma < 1$ The filter vector determines how long each shot noise "event" lasts. The value γ defines the frequency of the shot noise process. The value of β defines the increase of the shot noise level over the background level. It can be verified that the new process, w, retains the zero-mean and unit-variance property of the original process x, independent of the variables. Identities are computed to help derive this result, noting that y is a discrete-valued random variable which takes on only two values.

$$E=[y]=(1-\gamma)(0)+(\gamma)(1)=\gamma E[y^2]=(1-\gamma)(0)^2+(\gamma)(1)^2=\gamma E[y^3]=(1-\gamma)(0)^3+(\gamma)(1)^3=\gamma E[y^4]=(1-\gamma)(0)^4+(\gamma)(1)^4=\gamma$$ (6)

Resulting from the IID property, the following identities are identified. It should be noted that these identities on y also hold for β since it is also IID.

$$E[(y_j)(y_k)] = E[y_j]E[y_k] = E[y]^2 \text{ if } j \neq k$$ (7)

$$\begin{aligned} E[(y_j)(y_k)(y_l)] &= E[y_j]E[y_k]E[y_l] = E[y]^3 &&\text{if } j \neq k \neq l \\ &= E[y_j]E[y_k^2] &&\text{if } j \neq k = l \\ &= E[y_k]E[y_l^2] &&\text{if } k \neq l = j \\ &= E[y_l]E[y_j^2] &&\text{if } l \neq j = k \\ &= E[y^3] &&\text{if } j = k = l \end{aligned}$$ (8)

$$\begin{aligned} E[(y_j)(y_k)(y_l)(y_m)] &= E[y_j]E[y_k]E[y_l]E[y_m] = &&\text{if} \\ & E[y]^4 && j \neq k \neq l \neq m \\ &= E[y_j]E[(y_k)(y_l)(y_m)] &&\text{if} \\ &&& j \neq k, j \neq l, j \neq m \\ &= E[y_k]E[(y_j)(y_l)(y_m)] &&\text{if} \\ &&& k \neq j, k \neq l, k \neq m \\ &= E[y_l]E[(y_j)(y_k)(y_m)] &&\text{if} \\ &&& l \neq j, l \neq k, l \neq m \\ &= E[y_m]E[(y_j)(y_k)(y_l)] &&\text{if} \\ &&& m \neq j, m \neq k, m \neq l \\ &= E[y_j^2]E[y_l^2] = E[y^2]^2 &&\text{if} \\ &&& j = k \neq l = m \\ &= E[y_j^2]E[y_m^2] = E[y^2]^2 &&\text{if} \\ &&& j = l \neq m = k \\ &= E[y_j^2]E[y_k^2] = E[y^2]^2 &&\text{if} \\ &&& j = m \neq k = l \\ &= E[y^4] &&\text{if} \\ &&& j = k = l = m \end{aligned}$$ (9)

Referring back to equation (2), the zero-mean, unit-variance properties for w may be verified. That is, it can be shown that $E[w]=0$ and $E[w^2]=1$.

$$E[w] = E\left[\sigma\left(1 + \sum_j (f_j)(\beta_{i-j})(y_{i-j})\right)x_i\right] \quad (10)$$

$$= \sigma\left(1 + \sum_j (f_j)E[\beta]E[y]\right)E[x_i]$$

$$= \sigma\left(1 + \sum_j (f_j)B_1\gamma\right)(0)$$

$$= 0$$

$$E[w^2] = E\left[\sigma^2\left(1 + \sum_j (f_j)(\beta_{i-j})(y_{i-j})\right)^2 (x_i^2)\right] \quad (11)$$

$$= \sigma^2 E[x^2]\begin{pmatrix} 1 + 2\sum_j (f_j)E[\beta_{i-j}y_{i-j}] + \\ \sum_j \sum_k (f_j)(f_k)E[\beta_{i-j}\beta_{i-k}]E[y_{i-j}y_{i-k}] \end{pmatrix}$$

$$= \sigma^2 E[x^2]\begin{pmatrix} 1 + 2\sum_j (f_j)E[\beta]E[y] + \\ \sum_j (f_j^2)E[\beta^2]E[y^2] + \\ \left(\sum_j (f_j)\sum_k (f_k) - \sum_j (f_j^2)\right)E[\beta]^2 E[y]^2 \end{pmatrix}$$

$$= \sigma^2 E[x^2]\begin{pmatrix} 1 + 2\gamma\sum_j (f_j)E[\beta] + \gamma\sum_j (f_j^2)E[\beta^2] + \\ \gamma^2\left(\sum_j (f_j)\sum_k (f_k) - \sum_j (f_j^2)\right)E[\beta]^2 \end{pmatrix}$$

$$= \sigma^2 E[x^2](1 + 2\gamma F_1 B_1 + \gamma F_2 B_2 + \gamma^2(F_1 F_1 - F_2)B_1^2)$$

$$= E[x^2]$$

$$= 1$$

Note here that the double sum was split into diagonal terms, where j=k, and cross terms, where j≠k. For the diagonal terms the expectation yields the second statistical moment of the random variables, while for the cross terms, it yields the square of the mean due to the IID property of the random variables.

It is also necessary to verify that the new process, w, retains the whiteness property of the original process, x. That is, it is necessary to show $E[w_i w_j]=0$ if i≠j. This is easily shown since the $x_i$ and $y_j$ and $\beta_i$ variables are all independent of each other, and $E[x_i x_j]=0$ if i≠j.

$$E[w_i w_j] = E\begin{bmatrix} \{\sigma(1 + \sum_k (f_k)(\beta_{i-k})(y_{i-k}))(x_i)\} \\ \{\sigma(1 + \sum_l (f_l)(\beta_{j-l})(y_{j-l}))(x_j)\} \end{bmatrix} \quad (12)$$

$$= \sigma^2 E[x_i x_j] E\begin{bmatrix} \{1 + \sum_k (f_k)(\beta_{i-k})(y_{i-k})\} \\ \{1 + \sum_l (f_l)(\beta_{j-l})(y_{j-l})\} \end{bmatrix}$$

$$= 0 \text{ if } i \neq j, \text{ since } E[x_i x_j] = 0 \text{ if } i \neq j$$

Next, the kurtosis is computed for this random process. To do this the second and fourth statistical moments of the random variable, w, are used. Equation (11) gives the second statistical moment, so the fourth statistical moment is then calculated.

$$E[w^4] = E\left[\sigma^4\left\{1 + \sum_j (f_j)(\beta_{i-j})(y_{i-j})\right\}^4 (x_i^4)\right] = \quad (13)$$

$$\sigma^4 E[x^4]\Big\{1 + 4\sum_j (f_j)E[\beta]E[y] +$$

$$6\sum_j \sum_k (f_j)(f_k)E[(\beta_{i-j})(\beta_{i-k})]E[(y_{i-j})(y_{i-k})] +$$

$$4\sum_j \sum_k \sum_l (f_j)(f_k)(f_l)E[(\beta_{i-j})(\beta_{i-k})(\beta_{i-l})]$$

$$E[(y_{i-j})(y_{i-k})(y_{i-l})] +$$

$$\sum_j \sum_k \sum_l \sum_m (f_j)(f_k)(f_l)(f_m)E[(\beta_{i-j})(\beta_{i-k})(\beta_{i-l})(\beta_{i-m})]$$

$$E[(y_{i-j})(y_{i-k})(y_{i-l})(y_{i-m})]\Big\}$$

Now the multiple sums can be separated into terms of 4 equal indices, 3 equal indices, 2 pair equal indices, 1 pair equal indices, and all unique indices.

$$E[w^4] = \sigma^4 E[x^4]\Big\{1 + \quad (14)$$

$$4\left(\sum_j (f_j)E[\beta]E[y]\right) +$$

(1-pair) $\quad 6\left(\sum_j (f_j^2)E[\beta^2]E[y^2]\right) +$ (all unique) $\quad \left(\sum_j (f_j)\sum_k (f_k) - \sum_j (f_j^2)\right)E[\beta]^2 E[y]^2 +$ (3-of-a-kind) $\quad 4\left(\sum_j (f_j^3)E[\beta^3]E[y^3]\right) +$ (1-pair) $\quad 3\left(\sum_j (f_j^2)\sum_k (f_k) - \sum_j (f_j^3)\right)E[\beta^2]E[\beta]E[y^2]E[y] +$ (all unique) $\quad \left(\sum_j (f_j)\sum_k (f_k)\sum_l (f_l) - 3\sum_j (f_j^2)\sum_k (f_k) + 2\sum_j (f_j^3)\right)E[\beta]^3 E[y]^3 +$ (4-of-a-kind) $\quad 1\left(\sum_j (f_j^4)E[\beta^4]E[y^4]\right) +$ (3-of-a-kind) $\quad 4\left(\sum_j (f_j^3)\sum_k (f_k) - \sum_j (f_j^4)\right)E[\beta^3]E[\beta]E[y^3]E[y] +$ (2-pair) $\quad 3\left(\sum_j (f_j^2)\sum_k (f_k^2) - \sum_j (f_j^4)\right)E[\beta^2]E[\beta^2]E[y^2]E[y^2] +$ (1-pair) $\quad 6\left(\sum_j (f_j^2)\sum_k (f_k)\sum_l (f_l) - \sum_j (f_j^2)\sum_k (f_k^2) - 2\sum_j (f_j^3)\sum_k (f_k) + 2\sum_j (f_j^4)\right)$ $$E[\beta^2]E[\beta]^2 E[y^2]E[y]^2 +$$

-continued (all unique) $\quad \{\sum_j (f_j) \sum_k (f_k) \sum_l (f_l) \sum_m (f_m) - 6 \sum_j (f_j^2) \sum_k (f_k) \sum_l (f_l) +$ $3 \sum_j (f_j^2) \sum_k (f_k^2) + 8 \sum_j (f_j^3) \sum_k (f_k) - 6 \sum_j (f_j^4)\} E[\beta]^4 E[y]^4\}$ Substituting in for $F_n$, $B_n$, and $E[y^n]$, $$E[w^4] = \sigma^4 E[x^4]\{1 + \quad (15)$$

$4(F_1 B_1 \gamma) +$ (1-pair) $\quad 6(F_2 B_2 \gamma) +$ (all unique) $\quad (F_1 F_1 - F_2) B_1^2 \gamma^2) +$ (3-of-a-kind) $\quad 4(F_3 B_3 \gamma) +$ (1-pair) $\quad 3(F_2 F_1 - F_3) B_2 B_1 \gamma^2 +$ (all unique) $\quad (F_1 F_1 F_1 - 3 F_2 F_1 + 2 F_3) B_1^3 \gamma^3) +$ (4-of-a-kind) $\quad 1(F_4 B_4 \gamma) +$ (3-of-a-kind) $\quad 4(F_3 F_1 - F_4) B_3 B_1 \gamma^2 +$ (2-pair) $\quad 3(F_2 F_2 - F_4) B_2 B_2 \gamma^2 +$ (1-pair) $\quad 6$ $(F_2 F_1 F_1 - F_2 F_2 - 2 F_3 F_1 + 2 F_4) B_2 B_1^2 \gamma^3$ (all unique) $\quad (F_1 F_1 F_1 F_1 - 6 F_2 F_1 F_1 + 3 F_2 F_2 +$ $8 F_3 F_1 - 6 F_4) B_1^4 \gamma^4)\}$ Gathering terms to get a polynomial function of $\gamma$, $E[w^4] = \sigma^4 E[x^4]\{1 + \gamma(4F_1 B_1 + 6F_2 B_2 + 4F_3 B_3 + F_4 B_4) +$
$\gamma^2(6(F_1^2 - F_2)B_1^2 + 12(F_2 F_1 - F_3)B_2 B_1 + 4(F_3 F_1 - F_4)$
$B_3 B_1 + 3(F_2^2 - F_4)B_2^2) + \gamma^3(4(F_1^3 - 3F_2 F_1 + 2F_3)$
$B_1^3 + 6(F_2 F_1^2 - F_2^2 - 2F_3 F_1 + 2F_4)B_2 B_1^2) + \gamma^4(F_1^4 -$
$6F_2 F_1^2 + 3F_2^2 + 8F_3 F_1 - 6F_4)B_1^4\} \quad (16)$ Equation (16) and equation (11) are used to compute the kurtosis of w. Since those equations are both polynomial functions of $\gamma$, therefore the kurtosis of w will be a rational function of polynomials in $\gamma$. Referring to equations (11) and (16), the polynomial coefficients are:

$n_0 = 1 \; n_1 = 4F_1 B_1 + 6F_2 B_2 + 4F_3 B_3 + F_4 \; n_2 = 6(F_1^2 - F_2)B_1^2 +$
$12(F^2 F_1 - F_3)B_2 B_1 + 4(F_3 F_1 - F_4)B_3 B_1 + 3(F_2^2 - F_4)$
$B_2^2 \; n_3 = 4(F_1^3 - 3F_2 F_1 + 2F_3)B_1^3 + 6(F_2 F_1^2 - F_2^2 -$
$2F_3 F_1 + 2F_4)B_2 B_1^2 \; n_4 = (F_1^4 - 6F_2 F_1^2 + 3F_2^2 +$
$8F_3 F_1 - 6F_4)B_1^4 \quad (17)$ $d_0 = 1 \; d_1 = 2F_1 B_1 + F_2 B_2 \; d_2 = (F_1^2 - F_2)B_1^2 \quad (18)$ $$\text{kurtosis}[w] = E[w^4] / E[w^2]^2 = [\sigma^4 E[x^4]\{n_0 + \gamma n_1 + \quad (19)$$
$\gamma^2 n_2 + \gamma^3 n_3 + \gamma^4 n_4\}] / [\sigma^2 E[x^2]\{d_0 + \gamma d_1 + \gamma^2 d_2\}]^2$ Noting that $E[x^4]/E[x^2]^2 = 3$, since x is a Gaussian random variable, $\text{kurtosis}[w] = 3\{n_0 + \gamma n_1 + \gamma^2 n_2 + \gamma^3 n_3 + \gamma^4 n_4\}/\{d_0 + \gamma d_1 +$
$\gamma^2 d_2\}^2 \quad (20)$ Now the rational polynomial function in $\gamma$ can be optimized to find the value of $\gamma$ which gives the largest kurtosis. To do this optimization, the partial derivative of equation (20) is calculated with respect to $\gamma$.

$\partial/\partial\gamma(\text{kurtosis}[w]) = 3 \; [(4n_4 \gamma^3 + 3n_3 \gamma^2 + 2n_2 \gamma + n_1) \cdot (d_2 \gamma^2 +$
$d_1 \gamma + d_0)^2 - (n_4 \gamma^4 + n_3 \gamma^3 + n_2 \gamma^2 + n_1 \gamma + n_0) \cdot 2 \cdot (d_2 \gamma^2 + d_1 \gamma +$
$d_0) \cdot (2d_2 \gamma + d_1)] / (d_2 \gamma^2 + d_1 \gamma + d_0)^4 \quad (21)$ The maximum kurtosis will occur when the derivative is 0, so the maximum is calculated by finding the value of $\gamma$ which makes the numerator of equation (21) equal to 0. Canceling out one $(d_2 \gamma^2 + d_1 \gamma + d_0)$ term from both the numerator and denominator, and then expanding and collecting terms in the numerator around powers of $\gamma$, results in:

$$(4n_4 \gamma^3 + 3n_3 \gamma^2 + 2n_2 \gamma + n_1) \cdot (d_2 \gamma^2 + d_1 \gamma + d_0) - \quad (22)$$
$(n_4 \gamma^4 + n_3 \gamma^3 + n_2 \gamma^2 + n_1 \gamma + n_0) \cdot 2 \cdot (2d_2 \gamma + d_1) =$
$\gamma^4 (2n_4 d_1 - n_3 d_2) + \gamma^3 (n_3 d_1 + 4n_4 d_0 - 2n_2 d_2) +$
$\gamma^2 (3n_3 d_0 - 3n_1 d_2) + \gamma(2n_2 d_0 - 4n_0 d_2 - n_1 d_1) + (n_1 d_0 - 2n_0 d_1)$ To find the value of $\gamma$ which maximizes the kurtosis, the roots of equation (22) are calculated. By definition, $\gamma$ must be between 0 and 1, so the root within this range that gives the largest kurtosis is chosen. Any standard closed-form or iterative root finding methods may be used. One useful method of finding this root is to compute the derivative of this polynomial, and perform a Newton-Raphson search beginning at $\gamma = 0.2$. Note that the derivative is easily computed as $\partial/\partial\gamma(\text{equation (22)}) = 4\gamma^3(2n_4 d_1 - n_3 d_2) + 3\gamma^2(n_3 d_1 +$
$4n_4 d_0 - 2n_2 d_2) + 2\gamma(3n_3 d_0 - 3n_1 d_2) + (2n_2 d_0 - 4n_0 d_2 -$
$n_1 d_1) \quad (23)$ To summarize, an amplitude-modulated, zero-mean, unit-variance, white random sequence is calculated with the amplitude modulation determined by a random variable, $\beta$. The kurtosis of the sequence $w_i$ is closely related to $E[\beta]$, so a probability distribution can chosen for a normalized random variable, $\beta'$, such that $E[\beta'] = 1$ and the kurtosis can be manipulated by applying a scaling factor to this normalized random variable, $\beta = (\alpha - 1)\beta'$. The probability distribution may be an arbitrary probability distribution as long as it meets the assumptions. In practice, the random variable would be chosen to be non-negative, which will ensure that equation (5) is valid. By way of example, but not by way of limitation, three useful choices are listed for this distribution: constant value=1, a uniform distribution, or a chi-squared distribution with DOF=2.

Those skilled in the art will note that the duration of the filter impulse response determines the duration of the shot noise "events" that increase the noise amplitude above the baseline, so from a practical perspective it is useful to choose a filter with impulse response duration similar to the duration of transients in the real-world data. Filter impulse responses with a long response time are not desirable since this will filter out the variations of the shot noise, and therefore would restrict the ability to manipulate the kurtosis of the sequence $w_i$. The filter impulse response should also be non-negative, so that the shot noise always increases the vibration level above the baseline level, however, negative values may be used as long as equation (5) remains valid.

Figure 4A:
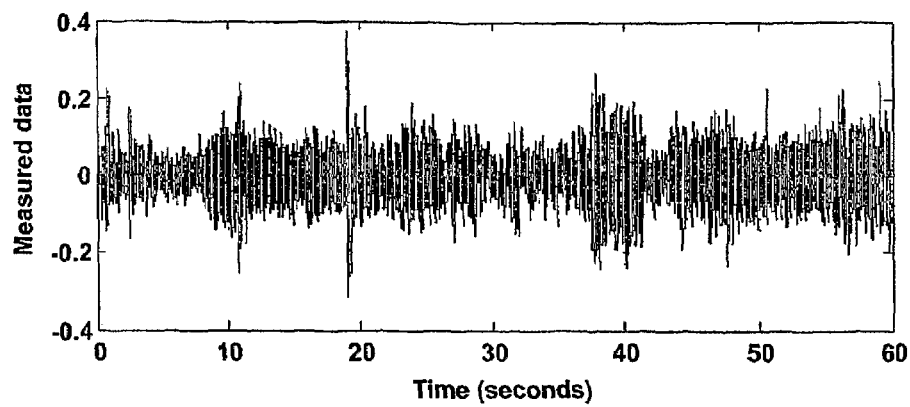
FIGS. 4($a$) through 4($c$) are a series of graphs of typical time-domain waveforms measured in the real world, compared to those produced by previous random vibration control systems, and those produced using the control system described herein.
Figure 4B:
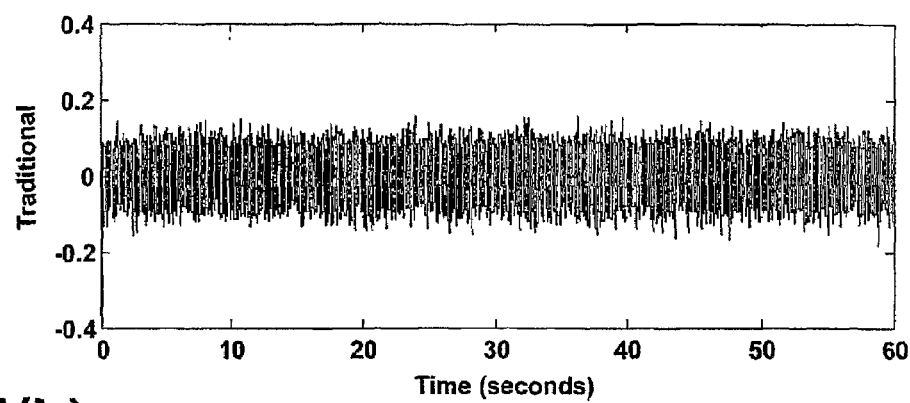
Figure 4C:
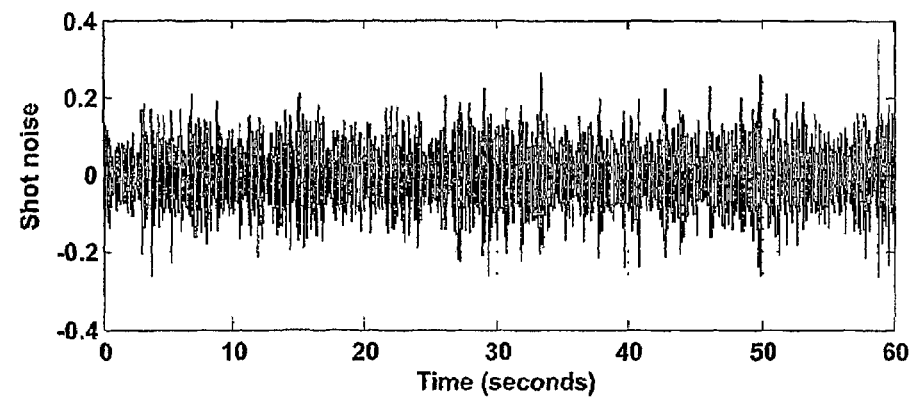

FIG. 4 graphs time waveforms for some real-world data, compared to equivalent waveforms produced by a standard random controller with Gaussian probability distribution, and those produced by the new method disclosed herein. The measured data was taken using an accelerometer mounted vertically inside a car while the car was driven down the road. As can be seen in FIG. 4(a), this measured data exhibits a level of continuous random vibration, with sporadic bursts of higher vibration levels when the car rides over bumps in the road. FIG. 4(b) demonstrates typical waveforms generated using the traditional random control method with a Gaussian probability distribution. While this waveform is random, it does not exhibit the wide variations in amplitude levels, instead providing the consistently uniform amplitude level which typifies Gaussian random variables. FIG. 4(c) demonstrates typical waveforms generated using the new random control method disclosed herein, with a kurtosis equal to that of the measured data. This waveform exhibits more variation in the amplitude, and more of the larger peaks exhibited by the real-world data.

Figure 5:
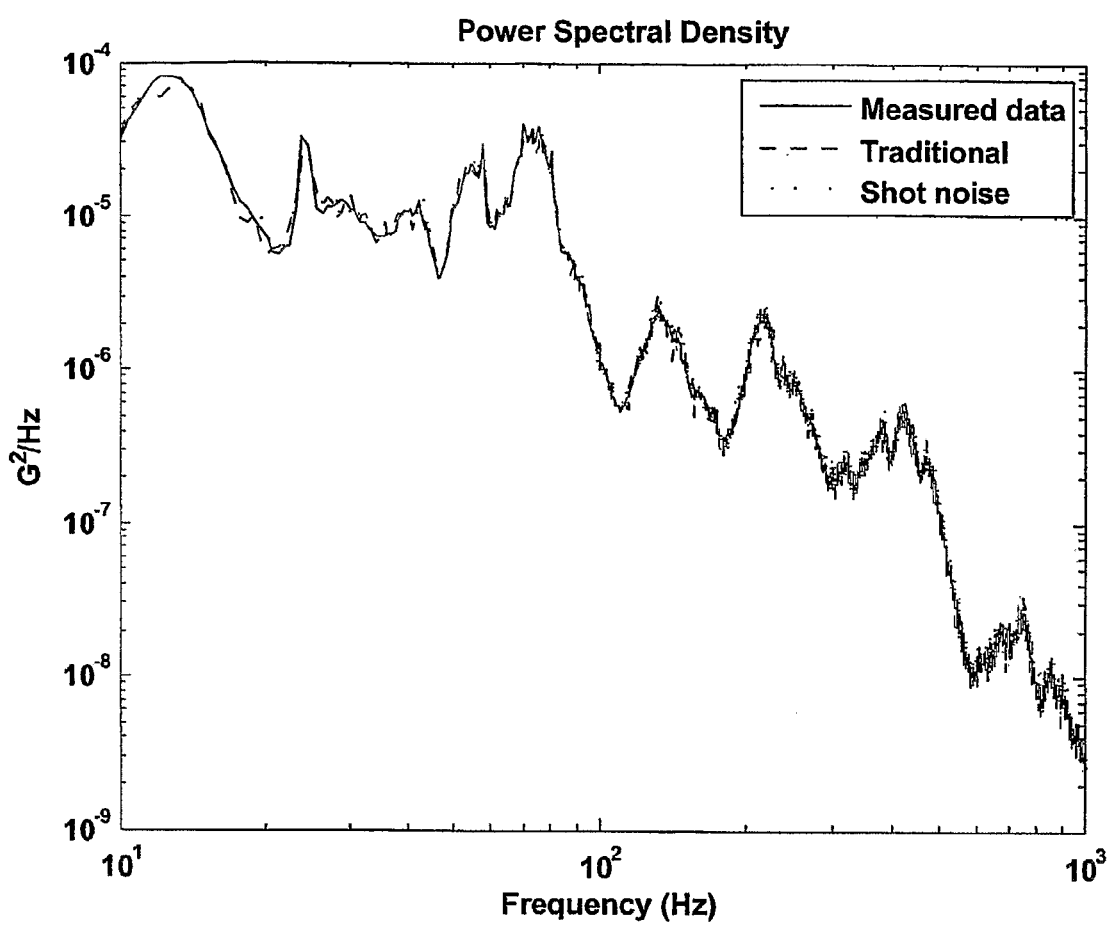
FIG. 5 is a graph of the power spectral density (PSD) for the time-domain waveforms plotted in FIG. 4.

FIG. 5 compares the average PSD for the three time waveforms shown in FIG. 4. The PSD for the three waveforms are the same within the expected variability in PSD calculations from random data. This demonstrates that the new method allows increased kurtosis while at the same time reproducing the desired PSD.

Figure 6:
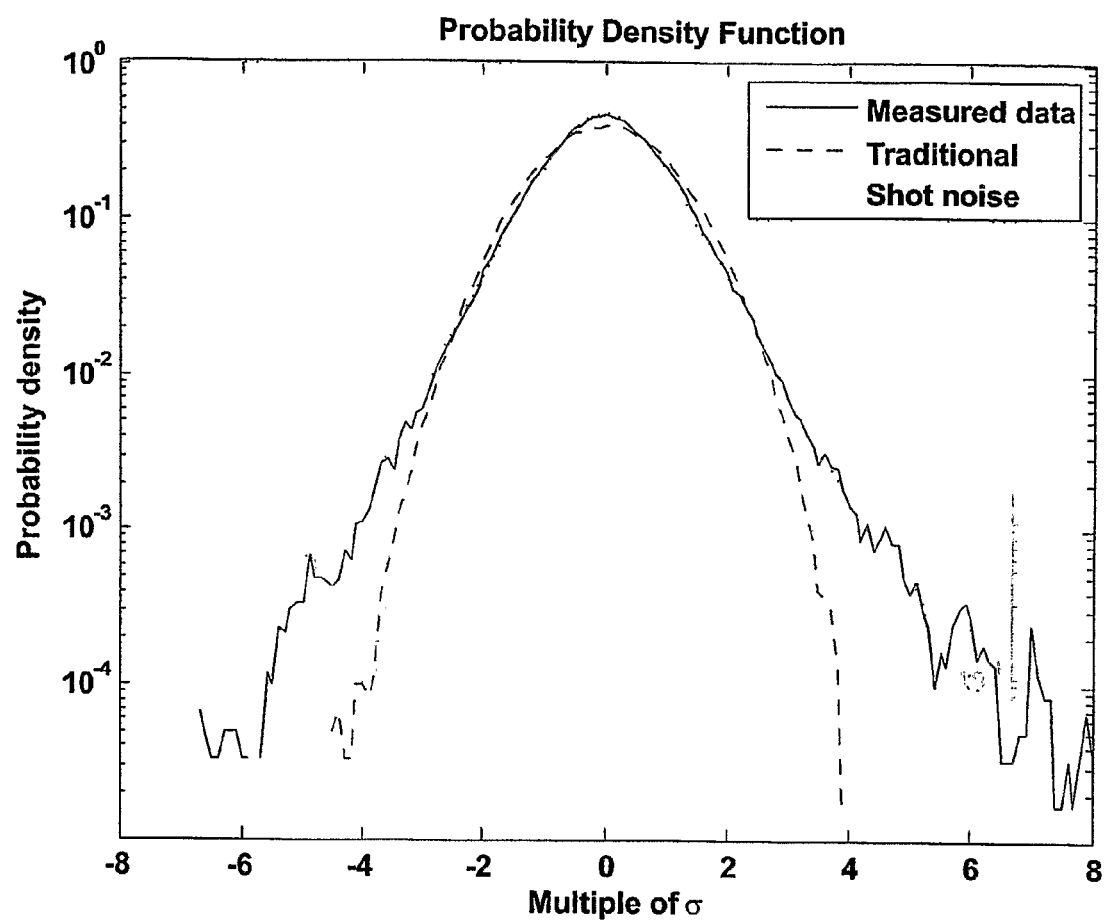
FIG. 6 is a graph of the probability density functions for the time-domain waveforms plotted in FIG. 4.

FIG. 6 compares the probability distribution for the three time waveforms shown in FIG. 4. Here the differences among the waveforms become evident. The waveform generated by the traditional random control exhibits a probability distribution characteristic of a Gaussian random variable, as expected, with the probability density becoming insignificantly small for amplitude levels above 4 times the RMS level. The measured road data exhibits a narrower central peak, with extended "tails" with significant probabilities as high as 6 times the RMS level. The waveform for the new random control method also exhibits the same narrower central peak and extended "tails", and as such it reproduces the probability distribution of the actual road much better than the traditional method. The kurtosis measure bears this out as well, giving kurtosis values of 4.8 for the measured waveform, 3.0 for the traditional random control method, and 4.8 for the new random control method.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for simultaneously controlling both frequency spectrum and kurtosis of a random vibration, comprising:
   at least one transducer for measuring motion of a test object, the transducer produces an output;
   an analog-to-digital (A/D) converter to convert the transducer output to a digital motion signal;
   a first converter to convert the digital motion signal to a power spectral density (PSD) representation;
   a first comparator for comparing the signal PSD to a reference PSD for compensating a desired drive PSD for error;
   a second converter to convert the digital motion signal to a kurtosis value;
   a second comparator for comparing the kurtosis to a reference value, the second comparator produces an output for compensating the kurtosis of a noise generator for error;
   a noise generator with kurtosis set by the output of the second comparator, the noise generator produces an output;
   a third converter to convert the desired drive PSD to a filter function;
   a filter to shape the frequency spectrum of the output from the noise generator to produce a digital drive signal; and
   a digital-to-analog (D/A) converter for converting the digital drive signal to an analog signal to drive a vibration generator.

2. A vibration control system as in claim 1 wherein an additional converter converts the digital drive signal to a PSD representation; and
   the first comparator uses a ratio of the signal PSD and the digital drive PSD to compensate the desired drive PSD for error.

3. A vibration control system as in claim 1, wherein the first converter further determines the cross spectral density between the digital drive signal and the digital motion signal.

4. A vibration control system as in claim 3, wherein the first comparator uses the cross spectral density for compensating the desired drive PSD for error.

5. A method for simultaneously shaping frequency spectrum and kurtosis of a random process comprising the steps of:
   generating a non-Gaussian white noise with prescribed kurtosis;
   filtering the non-Gaussian white noise using a linear filter;
   adjusting a first feedback control to control the linear filter for achieving a desired frequency spectrum; and
   adjusting a second feedback control to adjust the non-Gaussian white noise to achieve a desired kurtosis.

6. A method for producing a zero-mean, constant-variance, white noise output with adjustable kurtosis comprising the step of:
   generating a zero-mean, unit-variance Gaussian white noise source;
   amplitude modulating the Gaussian white noise source by a modulation variable; and
   adjusting the modulation variable to achieve a desired kurtosis.

7. A method for producing a zero-mean, constant-variance, white noise output with adjustable kurtosis comprising the steps of:
   generating a zero-mean, unit-variance Gaussian white noise source; and
   amplitude modulating the Gaussian white noise source by a deterministic sequence.

8. A method for producing a zero-mean, constant-variance, white noise output with adjustable kurtosis comprising the steps of:
   generating a zero-mean, unit-variance Gaussian white noise source; and
   amplitude modulating the Gaussian white noise source by a pseudo-random sequence.

9. A method for producing a zero-mean, constant-variance, white noise output with adjustable kurtosis comprising the steps of:

generating a zero-mean, unit-variance Gaussian white noise source; and amplitude modulating the Gaussian white noise source by a random sequence.

10. The method for producing a zero-mean, constant-variance, white noise output as in claim 9, wherein the modulation variable is a constant baseline level with additive filtered random shot noise.

11. The method for producing a zero-mean, constant-variance, white noise output as in claim 9, wherein an additive shot noise is not filtered.

12. A method for controlling a random signal with simultaneous control of both power spectral density (PSD) and kurtosis comprising the steps of:

measuring a control signal using a transducer;

converting the control signal to a PSD vector;

comparing the control PSD vector with a reference PSD vector to provide a compensated PSD vector;

converting the compensated PSD vector to a filter function;

converting the control signal to a kurtosis value;

comparing the control kurtosis value with a reference kurtosis value to provide a compensated kurtosis value;

adjusting the kurtosis of a white noise random generator with the compensated kurtosis value; and filtering the white noise from the random generator by the filter function to provide an output signal used to drive a control process.

* * * * *